April 7, 1970  W. V. BLEVINS  3,504,542
AIR FLOWMETER
Filed Aug. 21, 1967
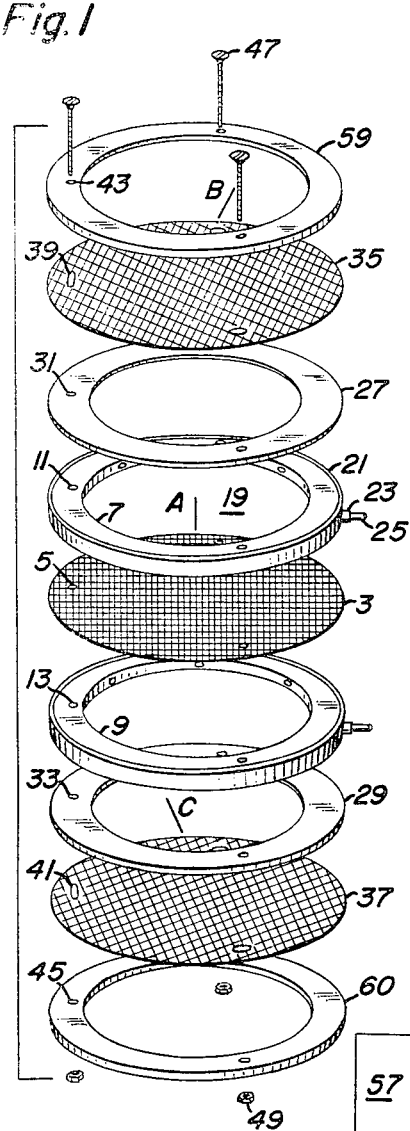
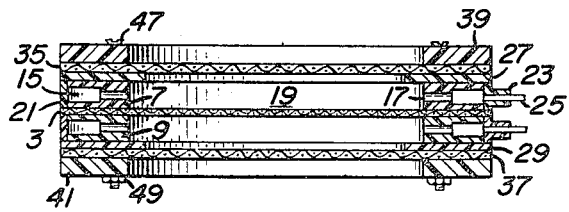
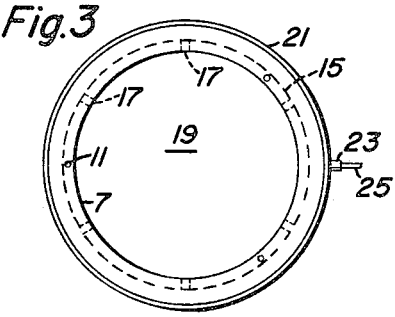
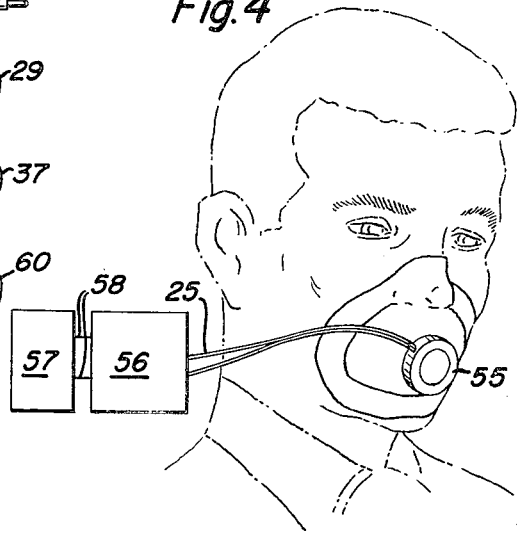
INVENTOR
William V. Blevins

United States Patent Office 3,504,542
Patented Apr. 7, 1970

3,504,542
AIR FLOWMETER
William V. Blevins, Joppa, Md., assignor to the United States of America as represented by the Secretary of the Army
Filed Aug. 21, 1967, Ser. No. 662,209
Int. Cl. G01f 3/36
U.S. Cl. 73—205    7 Claims

ABSTRACT OF THE DISCLOSURE

A flowmeter comprising dual sensing elements which maintains a linear pressure-flow signal at a low resistance to flow and at a low range of rate of flow.

DEDICATORY CLAUSE

The invention described herein may be manufactured, used, and licensed by or for the Government for governmental purposes without the payment to me of any royalty thereon.

SPECIFICATION

This invention relates to a respiratory air flow measuring device designed for the purpose of measuring the pressure drop inside of a protective mask while the mask is being worn.

My invention makes possible a reduction in size of a differential pressure type air flowmeter and permits the flowmeter to be worn under a protective mask. Furthermore, when worn, the device is designed to maintain a linear pressure-flow signal at a relatively low to moderate resistance to air flow.

Current tolerance and efficiency of new protective masks require more critical and exacting pressure measurements than were necessary in the past, and suitable instrumentation for these measurements is not commercially available. Utilizing the existing large flowmeters, the pressure drop inside of the protective masks was measured across various porous materials such as, for example, fabrics, filter paper, etc. Such flowmeters were not reliable because the pressure-flow relationship was adversely affected when the porous materials became wet or dust laden. Furthermore, a sensing element having a large cross-sectional area was required in order to keep the resistance low. Moreover, such large devices were unable to produce any linear pressure signal such as obtained through the use of my device.

A principal object of this invention is to provide a reliable means to produce linear pressure signals over a flow range of at least 0 to 250 liters per minute.

Another important object of this invention is to provide a means to produce linear pressure signals which are small in size, light weight, non-corrosive, of a rigid construction, and which provide a constant relationship of the flow measuring elements.

Other objects, advantages, and uses of my invention will be apparent from the following description, drawing, and appended claims.

FIGURE 1 is an exploded perspective view of my flowmeter.

FIGURE 2 is an enlarged vertical sectional view of my assembled flowmeter.

FIGURE 3 is a plan view of the pressure manifold showing a channel having a plurality of ports therein.

FIGURE 4 is a diagrammatic view of my flowmeter mounted within a mask to show the relative position and the utility thereof.

My invention will now be described in detail as follows:

FIGURE 1 shows an exploded view of my flowmeter, which, with the exception of screens 3, 35, and 37, is made of plastic and comprises nine members. The device has a central wire screen 3 which may have a plurality of equally spaced mounting holes 5, is 200 mesh woven stainless steel, and is made of a 0.002″ diameter wire. Vertical axis A in FIGURE 1 is designated as the point of reference for the orientation of the related members of my device which will subsequently be described. Screen 3 is located between a pair of pressure manifolds 7 and 9; each manifold may have a plurality of equally spaced mounting holes 11 and 13 respectively. Since the structure of each of members 7 and 9 is identical, henceforth only the member 7 will be described in full detail. To avoid further repetition, all of the previously mentioned and henceforth referred to mounting holes are of equal number and in a complete alignment with each other. Pressure manifold 7 has a channel 15, shown in FIGURE 3, having a plurality of evenly spaced ports 17, also shown in FIGURE 3. These ports are means of connecting channel 15 and inner area 19. Channel 15 is surrounded and enclosed by sealing ring 2 which has an integral hollow stem 23 connecting with said channel 15. Ring 21 is firmly cemented to prevent leakage of air from channel 15. Stem 23 has cemented therein a suitable length of flexible plastic tubing 25 which extends and connects onto a transducer 56 connected to recorder 57 by leads 58, shown schematically in FIGURE 4. Thus, air communication is established from within the inner diameter 19 through the plurality of ports 17, channel 15, stem 23, and on through flexible plastic tubing 25 into the transducer. A pair of air controlling orifices 27 and 29, each of which may have a plurality of mounting holes 31 and 33 respectively, are located adjacent to and on the side opposite manifolds 7 and 9, whereat screen 3 is located. The air flow through my flowmeter device is further controlled by means of a first screen 35 located adjacent to orifice 27 and on the side opposite thereto whereat manifold 7 is located, and a second similar screen 37 located adjacent to orifice 29 and on the side opposite thereto whereat manifold 9 is located. Screens 35 and 37, each may have a plurality of mounting holes 39 and 41 respectively, are of the same dimensions as central screen 3, and are made of .004″ diameter 60 mesh woven steel wire. Upon assembly of my flowmeter, screen 35 is oriented so that its vertical axis will be positioned or rotated 22½° one side of the vertical axis A of the flowmeter, and screen 37 is oriented so that its vertical axis C will be positioned or rotated 22½° to the other side of the vertical axis A of the flowmeter. Retaining rings 59 and 60, each may have a plurality of mounting holes 43 and 45 respectively, are located adjacent to screens 35 and 37 and on the sides opposite to our controlling orifices 27 and 29 respectively. The aforementioned components of my flowmeter are clamped together by means of a plurality of screws 47 and nuts 49 or any equivalent clamping means.

After assembly as above described, my flowmeter 55 is ready to be firmly and hermetically sealed at the mouth area of the wearer's face mask as shown in FIGURE 4.

Upon inhalation or exhalation, air flow through my flowmeter produces a pressure drop across screens 35 and 37 and orifices 27 and 29. Said pressure drop alters the differential pressure developed across central screen 3 in a manner that produces a linear pressure signal related to the instantaneous air flow. Pressure manifolds 7 and 9, located on either side of screens 35 and 37, by means of orifices 17, serve to control the externally applied pressure.

While my flowmeter is shown to have an annular configuration, this is merely preferred, and any configuration to suit the utility is adaptable. It is obvious that other modifications can be made of my invention, and I desire my invention to be limited only by the scope of the appended claims.

I claim:

1. A flowmeter having component parts comprising a central screen, a pair of pressure manifolds located one on either side of and in contact with said central screen, a pair of air controlling orifices located in contact with said manifolds and on the side thereof opposing said central screen, said controlling orifices being adapted to alter a differential pressure developed across the central screen and produce a linear pressure signal, a pair of screens located in contact with said air controlling orifices and on the side thereof opposing said manifolds, said pair of screens being adapted to permit air to flow through the flowmeter, a pair of retaining members located in contact with the said pair of screens and on the side thereof opposing said air controlling orifices, fluid flow means connecting the internal area of said flowmeter with the outside environment of said flowmeter, means cooperating with the flowmeter for connecting said pressure manifolds to a recording device, and clamping means to maintain the component parts of said flowmeter in the aforementioned relationship.

2. The flowmeter of claim 1 wherein the component parts have an annular construction.

3. The flowmeter of claim 1 wherein said pair of screens are located so that a plurality of grid wires of the first member of said pair is approximately 22½° to one side of a plurality of grid wires of the central screen of the flowmeter and a plurality of grid wires of the second member of said pair is approximately 22½° to the opposite side of the plurality of grid wires of the central screen of the flowmeter.

4. The flowmeter of claim 3 wherein each member of said pair of screens comprises 0.004 inch diameter 60 mesh woven steel wire.

5. The flowmeter of claim 1 wherein said central screen comprises 0.002 inch diameter 200 mesh woven stainless steel wire.

6. The flowmeter of claim 1 wherein each component thereof has a plurality of mounting holes therethrough, said mounting holes being adapted to cooperate with the clamping means.

7. The flowmeter of claim 1 wherein the clamping means comprises a plurality of screws and nuts.

References Cited

UNITED STATES PATENTS

| 1,265,676 | 5/1918 | Klump | 73—406 |
| 1,538,793 | 5/1925 | Gallagher et al. | 73—38 |
| 3,349,619 | 10/1967 | Millar. | |

FOREIGN PATENTS

| 435,176 | 10/1935 | Great Britain. |
| 1,492,508 | 7/1967 | France. |

RICHARD C. QUEISSER, Primary Examiner

J. K. LUNSFORD, Assistant Examiner